United States Patent
Boisvert et al.

(10) Patent No.: US 7,641,229 B2
(45) Date of Patent: Jan. 5, 2010

(54) SEAT CONTROL STRUCTURE FOR OCCUPANT CLASSIFICATION SYSTEMS

(75) Inventors: Alan A. Boisvert, Rochester Hills, MI (US); Joshua Forwerck, Royal Oak, MI (US); Michael Zink, Grand Blanc, MI (US)

(73) Assignee: Autoliv ASP, Inc., Ogden, UT (US)

( * ) Notice: Subject to any disclaimer, the term of this patent is extended or adjusted under 35 U.S.C. 154(b) by 1849 days.

(21) Appl. No.: 10/603,631

(22) Filed: Jun. 25, 2003

(65) Prior Publication Data

US 2009/0204293 A1     Aug. 13, 2009

(51) Int. Cl.
B60R 21/16 (2006.01)
(52) U.S. Cl. ................................ 280/735; 180/273
(58) Field of Classification Search ............... 180/273, 180/271; 280/735
See application file for complete search history.

(56) References Cited

U.S. PATENT DOCUMENTS

| | | | | |
|---|---|---|---|---|
| 5,161,820 A | * | 11/1992 | Vollmer | ................... 280/730.1 |
| 5,232,243 A | | 8/1993 | Blackburn et al. | |
| 5,474,327 A | | 12/1995 | Schousek | |
| 5,612,876 A | | 3/1997 | Zeidler et al. | |
| 5,986,221 A | * | 11/1999 | Stanley | ........................ 177/136 |
| 6,012,007 A | | 1/2000 | Fortune et al. | |
| 6,015,163 A | | 1/2000 | Langford et al. | |
| 2005/0067828 A1 | * | 3/2005 | Norton | ........................ 280/806 |
| 2008/0100425 A1 | * | 5/2008 | Kiribayashi | .............. 340/425.5 |

FOREIGN PATENT DOCUMENTS

| | | |
|---|---|---|
| DE | 198 02 099 A1 | 7/1998 |
| DE | 197 52 976 C2 | 5/2000 |
| DE | 199 19 034 A1 | 11/2000 |
| DE | 197 56 804 C2 | 8/2001 |
| EP | 0 895 091 A2 | 2/1999 |
| EP | 0 891 898 B1 | 11/2002 |
| JP | 10-188724 | 7/1998 |
| JP | 2000-230853 | 8/2000 |
| JP | 2001-56260 | 2/2001 |
| WO | WO 97/10115 | 8/1996 |
| WO | WO 98/14345 | 9/1997 |
| WO | WO 00/51853 | 7/1999 |
| WO | WO 00/54064 | 2/2000 |

* cited by examiner

*Primary Examiner*—Faye M. Fleming
(74) *Attorney, Agent, or Firm*—Sally J Brown; Brinks Hofer Gilson & Lione

(57) ABSTRACT

An occupant classification system is provided based upon the use of an array of electrical switches arranged between a seat trim and a reactive surface. The switches produce selective outputs signals as an engaging surface makes contact with one or more of the switches when an occupant occupies the seat. The output signals are interpreted into a control signal to distinguish between occupants for controlling an inflatable restraint system. The occupant classification system also includes a control structure which defines a distance between the array of switches and the engaging surface that is greater than zero when the seat is unoccupied so that the switches are insensitive to the initial forces applied to the seat through the seat trim. The distance between one or more of the switches and the engaging surface decreases to zero when the occupant occupies the seat to produce the selective output signals.

20 Claims, 8 Drawing Sheets

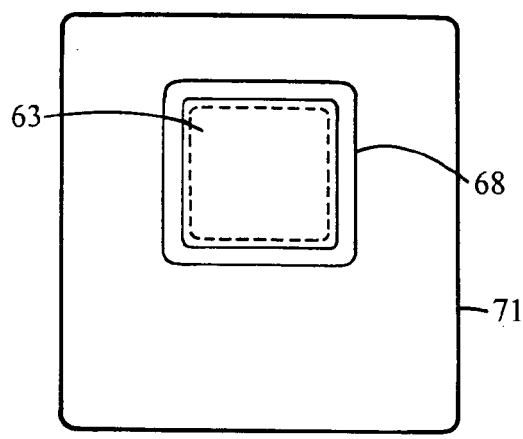
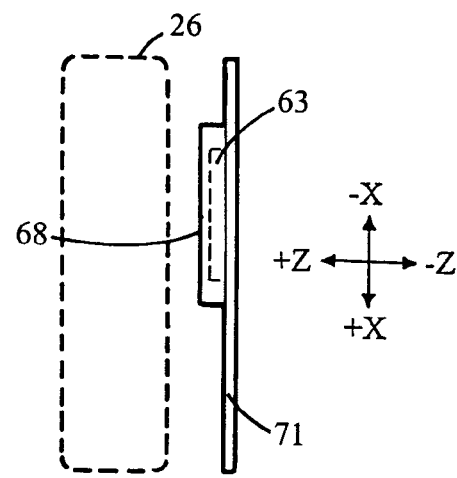
Fig. 9A   Fig. 9B
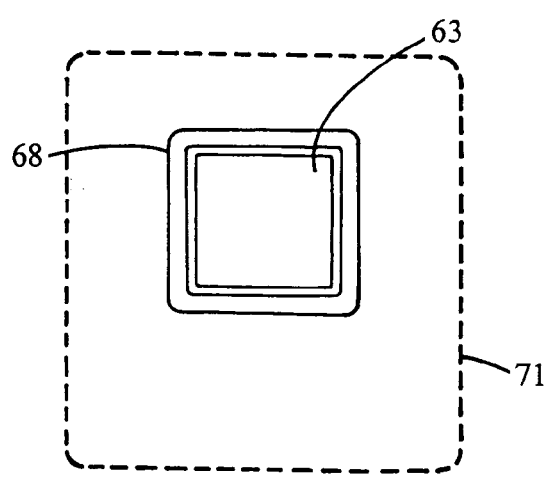
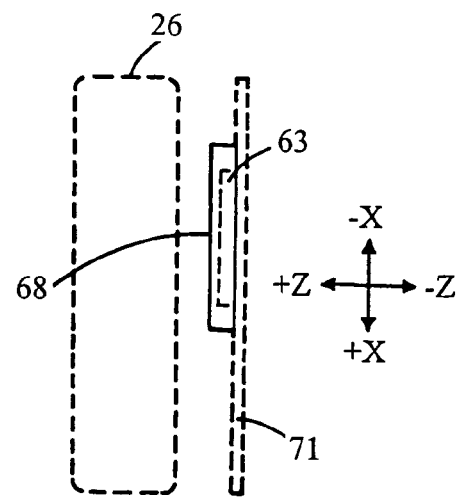
Fig. 10A   Fig. 10B

SEAT CONTROL STRUCTURE FOR OCCUPANT CLASSIFICATION SYSTEMS

FIELD OF THE INVENTION

This invention relates to a system for classifying occupants of a motor vehicle, specifically for purposes related to its inflatable restraint system.

BACKGROUND OF THE INVENTION

Air cushion restraint systems or inflatable restraints have been in use for several decades in automobiles. These systems have demonstrated their effectiveness in reducing occupant injuries in the event of vehicle impacts. Inflatable restraints are typically used to provide frontal impact protection, and variants are used for protection in side impact conditions. These systems generally incorporate a gas generator, referred to as an inflator, coupled with a flexible fabric bag which is stored in a folded condition and is inflated by the gasses generated by the inflator upon receiving a deployment signal. These devices are stored behind interior compartment panels and are normally hidden from view. Various types of impact sensors are located at strategic locations around the vehicle to detect the deceleration forces associated with a vehicle impact. A restraint system controller receives crash sensor inputs, evaluates them, and sends an appropriate deployment signal to initiate the deployment sequence when the sensors detect a particular crash-type and severity level.

Designers of inflatable restraint systems have made significant advancements in the design and manufacture of such systems. One area of development has been in the design of multiple level inflator systems. These systems incorporate an inflator capable of modulating the volume of produced gas and the deployment timing sequence as needed for a particular category of occupant or type of impact. In order for such systems to properly adapt to the occupant, some type of sensing system is needed to classify the occupant within certain ranges of seating height, mass, etc.

Frontal impact inflatable restraint systems are designed for seated occupants within a given seated height and mass range. Presently available inflatable restraint systems are not intended to provide impact protection for belted child restraints, or for various small sized children occupants. For these particular types of occupants, it is preferred to disable the inflatable restraint system entirely for that designated seating position.

Disabling an inflatable restraint for a given designated seating position may be accomplished through a manual driver input as is currently done with certain presently available vehicles. This approach is primarily provided for two-passenger vehicles where it may be necessary for a driver to place a child restraint seat in the front passenger seat of the vehicle. In such cases, the driver has a keyed switch to disable the inflatable restraint system for that designated seating position. Although such a manual inflatable restraint override switch is effective when used properly, there are concerns both by automotive manufacturers and governmental regulatory authorities that such an approach is cumbersome and unreliable. Improperly used, such systems can result in inappropriate deployment in some instances, and deactivation in conditions where the system could provide impact protection for the seated occupant.

In order to overcome the disadvantages of a manually operated inflatable restraint override switch, manufacturers have investigated and developed a number of technical solutions which automatically evaluate an occupant sitting in a vehicle. Examples of such automated systems include ultrasonic ranging systems which evaluate a sonic return signal as a means of classifying an occupant. Another general category of such occupant classification systems include the use of seat carried sensors. The seats are instrumented with a number of sensors which are activated to produce signals which are interpreted by the inflatable restraint system controller. Such switches may sense pressure, force, displacement, or may be sensitive to an electrical signal parameter such as capacitive coupling. Although such systems have proved effective, there is a continuing need to improve their reliability, ease of assembly, and enable the outputs of the seat sensors to be processed rapidly.

SUMMARY OF THE INVENTION

In accordance with the present invention, an occupant classification system is provided based upon the use of an array of electrical switches arranged beneath the seat cushion. These switches are placed in strategic locations or zones. Through the use of the data analysis techniques in accordance with this invention, occupant classification can be conducted rapidly and reliably.

In some embodiments, the array of electrical switches is arranged between a seat trim and a reactive surface. The switches produce selective outputs signals as an engaging surface makes contact with one or more of the switches when an occupant occupies the seat. The output signals are interpreted into a control signal to distinguish between occupants for controlling an inflatable restraint system. The occupant classification system also includes a control structure which defines a distance between the array of switches and the engaging surface that is greater than zero when the seat is unoccupied so that the switches are insensitive to the initial forces applied to the seat through the seat trim. The distance between one or more of the switches and the engaging surface decreases to zero when the occupant occupies the seat to produce the selective output signals.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIGS. 9A and 9B are see-through top and side views, respectively, of another alternative arrangement of the control structure and sensor system in accordance with the invention;

FIGS. 10A and 10B are see-through top and side views, respectively, of yet another alternative arrangement of the control structure and sensor system in accordance with the invention.

DETAILED DESCRIPTION OF THE INVENTION

Figure 1:
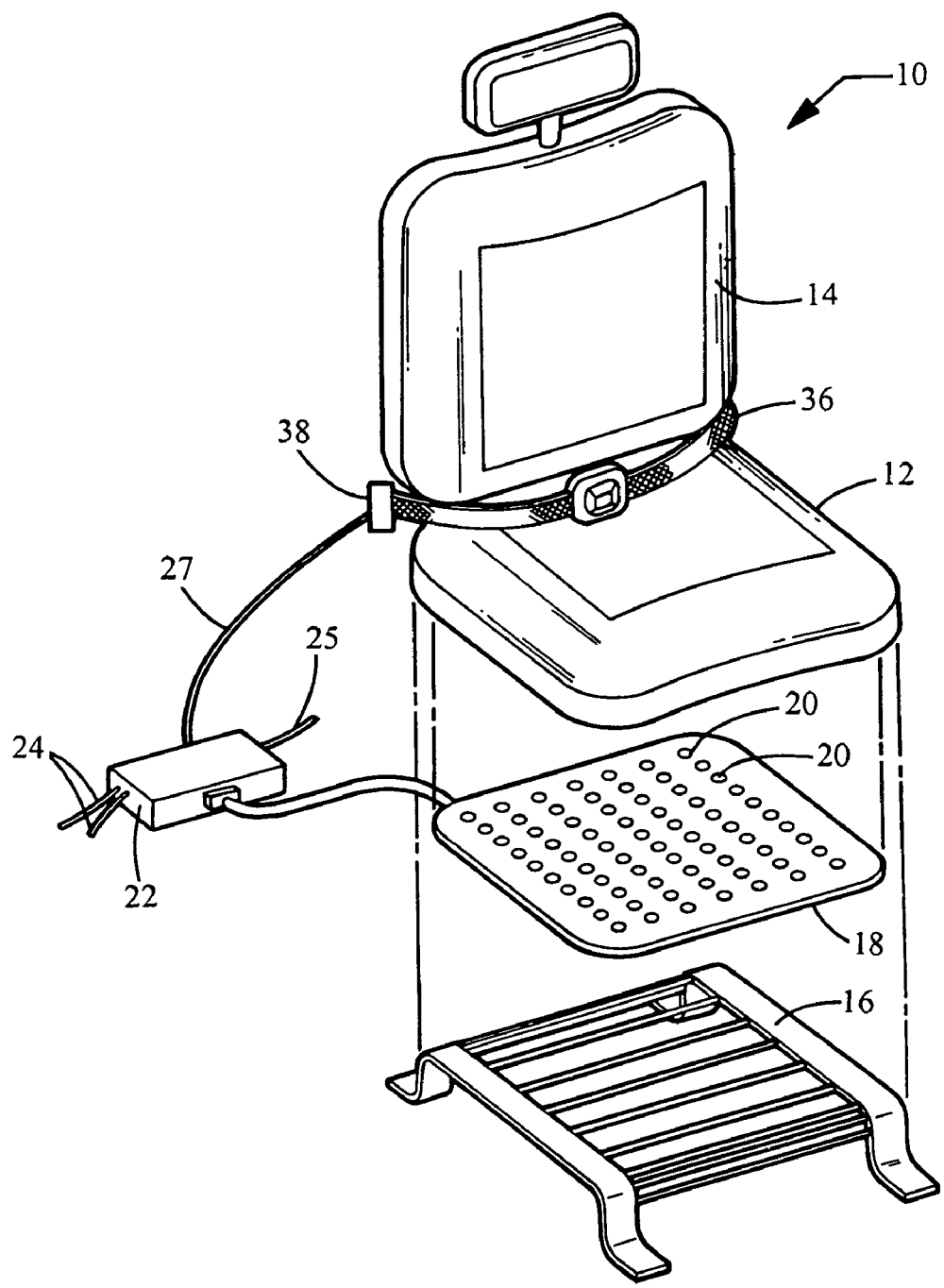
FIG. 1 provides an exploded pictorial view of a seat assembly in accordance with the present invention.

A seat assembly incorporating the features of this invention is illustrated in an exploded manner in FIG. 1 and is generally designated there by reference number 10. Seat assembly 10 principally comprises seat cushion 12 and seat back 14 which provide the primary seating surfaces for the occupant. Underlying seat cushion 12 and providing structural support for the seat assembly 10 is seat suspension assembly 16. A number of individual electrical switches 20, such as on/off switches, are arranged in a desired pattern and carried by switch array mat 18. As will be explained in further detail later in this description, the outputs of on/off switches 20 from mat 18 may be analyzed in a variety of manners to provide signals concerning the type of occupant occupying the seat assembly 10.

The outputs from the individual on/off switches 20 of mat 18 are processed using microprocessor based controller 22. Controller 22 receives inputs from crash sensors (not shown) on lines 24 and outputs an inflation signal on line 25 based on internal logic signal processing.

As further shown in FIG. 1, a belt restraint system 36 is provided for seat assembly 10. The belt restraint system includes a belt tension sensor or other high belt load indicator 38. Sensor 38 is provided to identify seat belt tension loads that are higher than the comfort level of a normally seated adult occupant. Controller 22 receives the outputs from sensor 38 on line 27 and disables the associated inflatable restraint system when high belt loads are detected which are associated with cinching a child seat in position within seat assembly 10. Since belt loads on a child's seat can cause switches 20 to turn-on in a manner similar to a heavier occupant, the belt tension sensor 38 is required to measure a belt tension load which exceeds some threshold of, for example, twenty or thirty pounds or higher, to indicate to the system that a small occupant with a large belt load on the child's seat is present.

Figure 2:
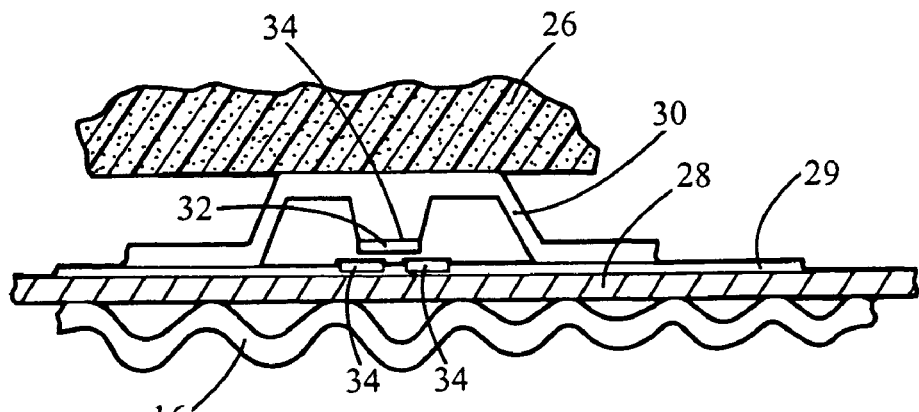
FIG. 2 is a side cross sectional view of one of the seat switches of the seat assembly shown in FIG. 1.

Various designs of on/off switches 20 may be used in connection with this invention. FIG. 2 illustrates in a cross-sectional view the construction of one of the on/off switches 20. As illustrated, the switches 20 are placed between seat foam layer 26 and a flexible plastic sheet 28 which directly contacts seat suspension 16. An elastomeric dome structure 30 supports switch contact 32. When compressed by a sufficient force, dome structure 30 collapses and switch contact 32 falls into physical contact with switch contacts 34 carried by switch base sheet 29 bridging those contacts to provide a closed electrical circuit. Switches such as these are referred to electrically as single-pole, single-throw, normally-open types.

A preferred material for forming elastomeric dome structure 30 is silicone rubber, which is believed to provide a desired level of performance, ruggedness, and reliability. Plastic sheet 28 over the suspension system 16 provides a stable surface for the activation forces on switches 20. The force necessary to close the contacts for switches 20 would be based upon experimental investigation. In one implementation of the present invention, on/off switches 20 were selected having a turn-on force of 3.86 N (exerted in a direction compressing dome 30 downwardly). Other seat configurations would likely require different turn-on forces necessary to distinguish between occupants such as adult and child occupants.

Other configurations of switches 20 may be used with this invention such as normally closed types in which an electrical circuit is opened when a force exceeding a threshold level acts on the switch. Further, other switch variations could be used for detecting displacement, force, or pressure acting on the seat such as variable resistors which provide a range of outputs over a continuum.

Switches 20 are located to detect the critical pressure points by a process used for initially selecting the switch locations for a particular motor vehicle and seat application. Implementations can detect various types of occupants for use with multiple level inflators. In an initial calibration and design process, various occupants and FMVSS 208 anthropoids are placed in seat assembly 10. During that initial design process, a switch array mat having a large number, for example 2,016 individual pressure cells or switches, are located and carried by the array mat. The critical pressure points are identified from the signals generated from the array of switches for different sized occupants, with and without child seats, with and without different seat belt tensile loads, at the various seat back 14 recline angles. Various types of occupants which would include fifth, fiftieth, and ninety-fifth percentile male and female, and various sized child anthropoids along with various child restraint systems, are installed in the seat. Electrical signal patterns are developed by the individual switches, are analyzed for each condition. Based on the particular patterns of activation, a smaller number of on/off switches 20 are strategically located on mat 18. In the example illustrated, array mat 18 features seventy switches 20.

For any of the examples above, if a seat belt tension load above a predetermined level is sensed by the belt tension sensor 38, the associated inflatable restraint system is disabled, irrespective of the activation pattern of switches 20.

Figure 3A:
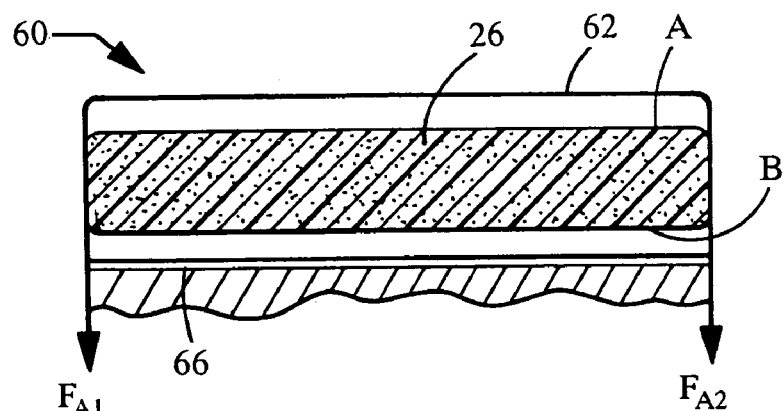
FIG. 3A illustrates the forces acting on a seat.

The classification system also incorporates other features which control the forces acting on the switches 20. For purposes of illustrations, FIG. 3A depicts the forces acting on a standard seat structure 60. In particular, a total force F(t) is generated by the assembly of a seat trim 62, a foam layer 26 of the seat cushion, and a seat pan 66. This force F(t) is equal to the sum of the attachment forces $F_{A1}$ and $F_{A2}$ applied at the edges of the fabric or trim 62 covering the seat 60. The force F(t) can range from zero to an unknown value and may also change over the life of the vehicle.

Figure 3B:
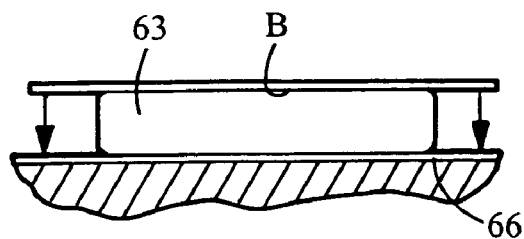
FIG. 3B illustrates the forces acting on a sensor in a seat without a control structure.

The attachment forces $F_{A1}$ and $F_{A2}$ affect the pressure and displacement of the "A" and "B" surfaces of the foam layer 26. These surfaces are typically the installation locations for an occupant classification sensor that measures pressure, displacement, and/or force produced when an occupant sits in the seat 60. For example, there is shown in FIG. 3B a sensor 63 positioned between the "B" surface of the cushion 26 and the seat pan 66. In such an arrangement, variations in the assembly process, part tolerance, and material aging have a direct affect on the sensor's 63 ability to classify occupants accurately and reliably over time because of the variability of the forces (indicated by the downward arrows) imparted on the sensor 63.

Figure 3C:
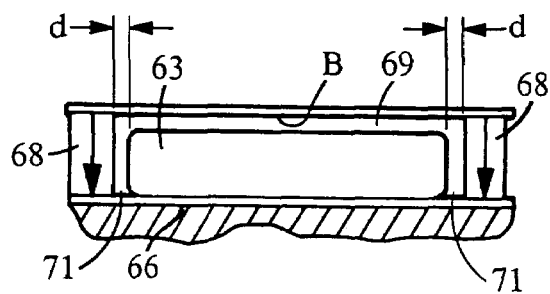
FIG. 3C illustrates the force distribution in a seat with a control structure in accordance with the invention.

Because of the variability of the force F(t) that may occur over time, in accordance with the invention, a control layer or control structure 68 is positioned between the "B" surface and the seat pan 66, as shown in FIG. 3C, thereby defining a control interface region 69 between "B" surface of the foam layer 26 and the sensor 63. Functionally, the control layer 68 controls the forces applied to the sensor 63 by generating a reaction surface 71 around the sensor 63, for example, and therefore removes the variations and errors that affect the sensor's performance. The distance between the sensor 63 and the foam layer 26 and the compressibility of the control layer 68 can be modified to compensate for the different pressures, displacements, and/or forces (indicated by the downward arrows) that occur over time. For example, the greater the thickness of the control layer 68, the greater the distance between the sensor 63 and the actuation surface "B", resulting in an increase in tolerance for variations in the attachment forces $F_{A1}$ and $F_{A2}$. That is, the larger effective distance between the sensor 63 to the actuation surface "B" results in more force being necessary to generate the required displacement or pressure on the sensor 63. Further, the gap, d, between the control layer 68 and the sensor 63 also affects the amount of force that has to be applied through the seat to cause the actuation surface "B" to contact the sensor 63. For example, as the gap, d, is increased, the effective length of the actuation surface "B" between the left and right portions of the control layer 68 is increased. As such, less force is needed to cause the actuation surface "B" to contact the sensor 63.

Moreover, the compressibility or rigidity of the control layer 68 also affects its performance. That is, as the stiffness or rigidity of the a control layer 68 increases, the control layer 68 compresses less for a given amount of force applied to the control layer 68. Accordingly, more force is necessary to generate the desired pressure on and/or displacement on the sensor 63.

In conjunction with the sensors 63, the control layer 68 creates a foam to sensor layer control interface region. Thus, such a combination may be used to create an occupant classification system that is used in a vehicle seat system. As such, the occupant classification system may be used to enable or suppress an air bag control system to meet FMVSS 208 requirements.

The use of the control layer 68 differs from other types of strategies that sense the occupant with sensors that are always in contact with the bottom or "B" side of the cushion foam layer 26. In particular, aspects of the invention employ a frame to control the interface between the foam layer 26 and the sensor 63. The frame allows the system to be tuned independently of the sensor 63 to compensate for variations in seat designs, foam design, and trim tension variations. In addition, the control layer 68 may be located in the seat to calibrate the sensor 63 to certain occupant sizes and positions.

Figure 4A:
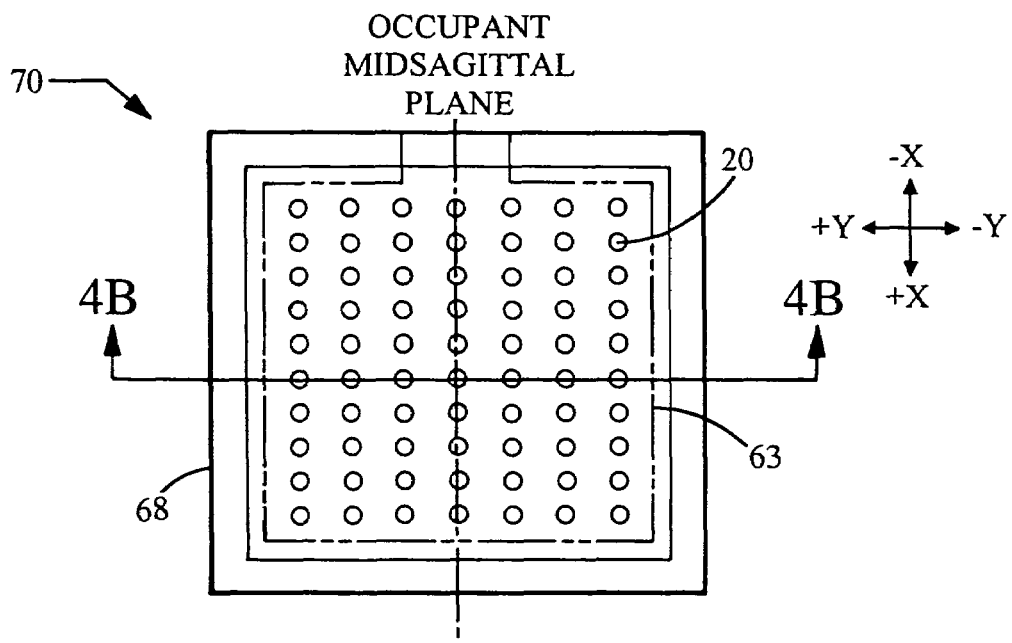
FIG. 4A illustrates a control structure surrounding a sensor system in accordance with the invention.
Figure 4B:
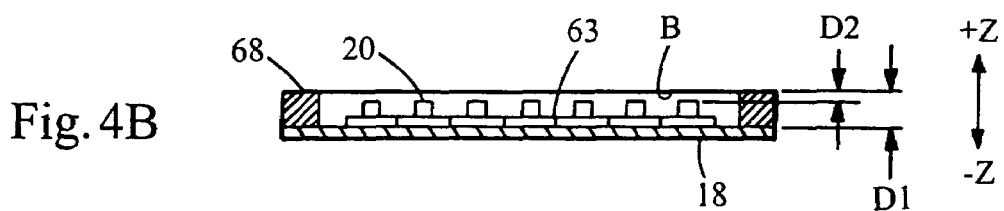
FIG. 4B is a cross sectional view of the control structure and sensor system of FIG. 4A taken along the line 4B-4B.
Figure 7A:
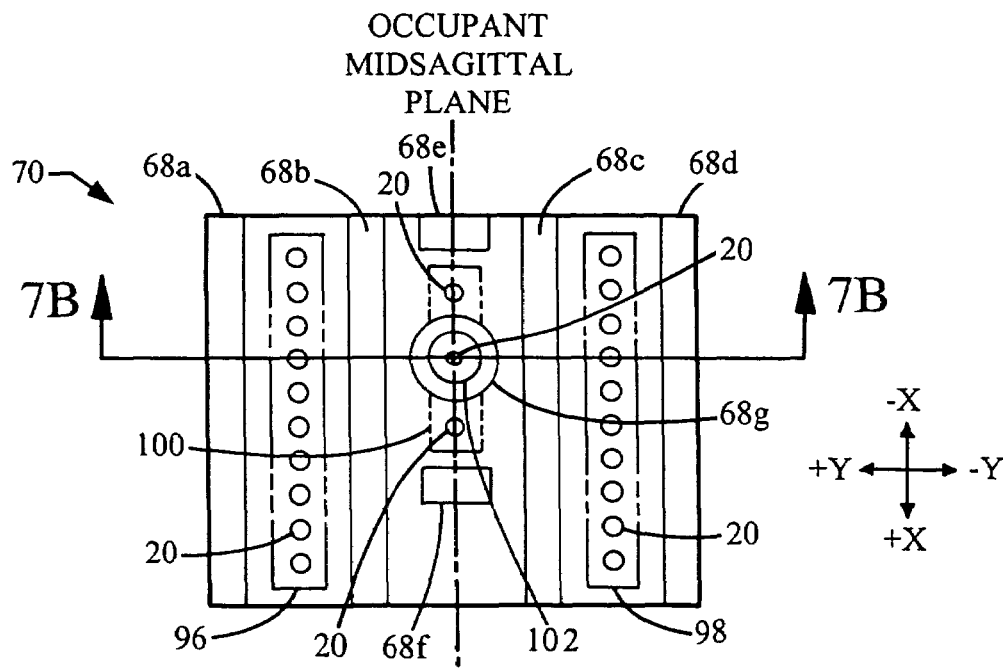
FIG. 7A illustrates a control structure arranged as segments in accordance with the invention.
Figure 7B:
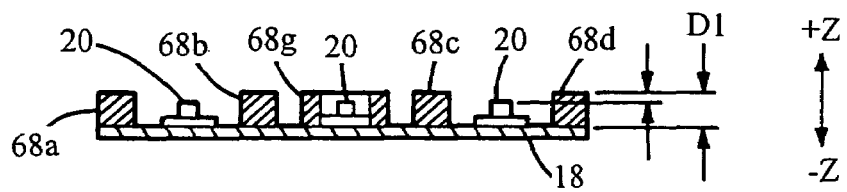
FIG. 7B is a cross sectional view of the control structure and sensor system of FIG. 7A taken along the line 7B-7B.

As discussed in detail below, the control layer 68 can be a frame that totally surrounds the sensor system (FIGS. 4A and 4B). Alternatively, the control layer 68 can be strips of specific geometry placed at discrete locations near the sensor 63 (FIGS. 7A and 7B).

FIGS. 4A and 4B depict an integrated unit 70 including the sensor 63 surrounded by the control layer 68. The sensor 63 may include an array of switches such as the on/off switches 20 carried by the array mat 18. The control layer 68 has a thickness of D1, and the difference between D1 and the height of the switches 20 define the control interface region 69 (as identified in FIG. 3C) with a thickness D2. Thus, as a compressive load is applied to the control layer 68 when an occupant sits on the seat centered more or less in the X-Y plane over the occupant midsagital plane, D1 and of course D2 decreases in the Z direction. Although the "B" surface is not initially in contact with the switches 20 when the seat is unoccupied, D2 ultimately decreases to zero so that contact is made between the "B" surface and one or more switches 20 when the occupant sits in the seat. In some configurations, once contact is made between one or more switches 20 and the "B" surface, the respective switch produces an "on" signal. Alternatively, the switch may produce a variable output related to the amount of load applied by the "B" surface to the switch.

Accordingly, the integrated unit 70 manages and maintains the interface between the "B" surface of the seat foam layer 26 and the sensor system 63. This enables the sensor system 63 to cope with, and maintain, various trim tension levels applied to the trim 62 covering the seat foam layer 26. Moreover, the integrated unit 70 defines the surface area for the interface between the "B" surface and the sensor system 63. This enables the sensor system 63 to define and control a particular pressure area interface with this sensor system 63 for different load geometries. By defining and managing the distance between the bottom or "B" surface of the seat cushion 26 and the top of the sensor system 63, the integrated unit 70 establishes a no load condition for the sensor system 63 during empty seat conditions, enables the sensor system 63 to manage and maintain sensitivity, and enables the sensor system 63 to have different sensitivities for different zones, as discussed in greater detail in connection with FIGS. 7A and 7B.

Figure 5A:
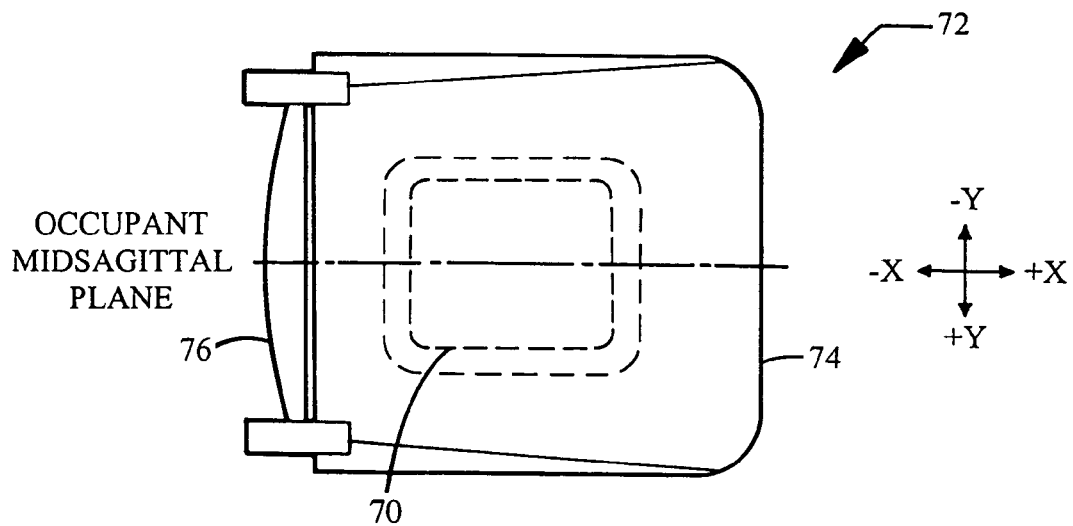
FIGS. 5A and 5B are see-through top and side views, respectively, of the control structure and sensor system of FIGS. 4A and 4B implemented in a bucket seat.
Figure 5B:
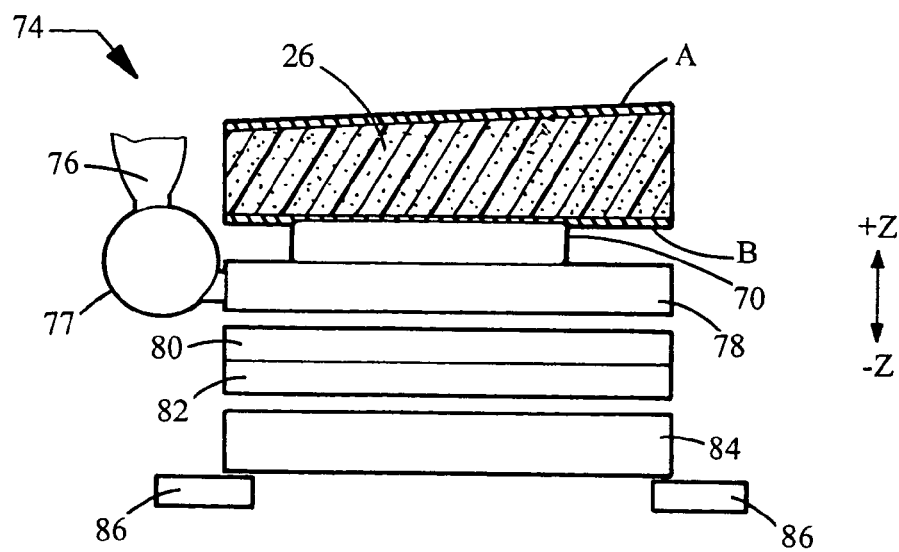

The integrated unit can be used in various types of seating configurations. For example, FIGS. 5A and 5B depict the integrated unit 70 employed in a bucket seat 72 with a seat cushion 74 and a seat back 76. The seat cushion 74 and the seat back 76 provide the primary seating surfaces for the occupant. A recliner unit 77 couples the seat cushion 74 to the seat back 76 and allows the seat back 76 to recline or move forward relative to the seat cushion 74, for example, to allow access to the back seat of the vehicle. The integrated unit 70 is positioned between the "B" surface of the seat cushion 74 and a cushion frame or pan 78. The pan 78 slides along an upper rail 80 and a lower rail 82 combination. The lower rail 82 is mounted on top of a riser 84 which is supported by a set of feet 86 bolted to the floorboard of the vehicle. Thus, as an occupant sits on the "A" surface of the seat cushion 74, the seat foam layer 26 compresses and imparts a force through the "B" surface to the integrated unit 70.

Figure 6A:
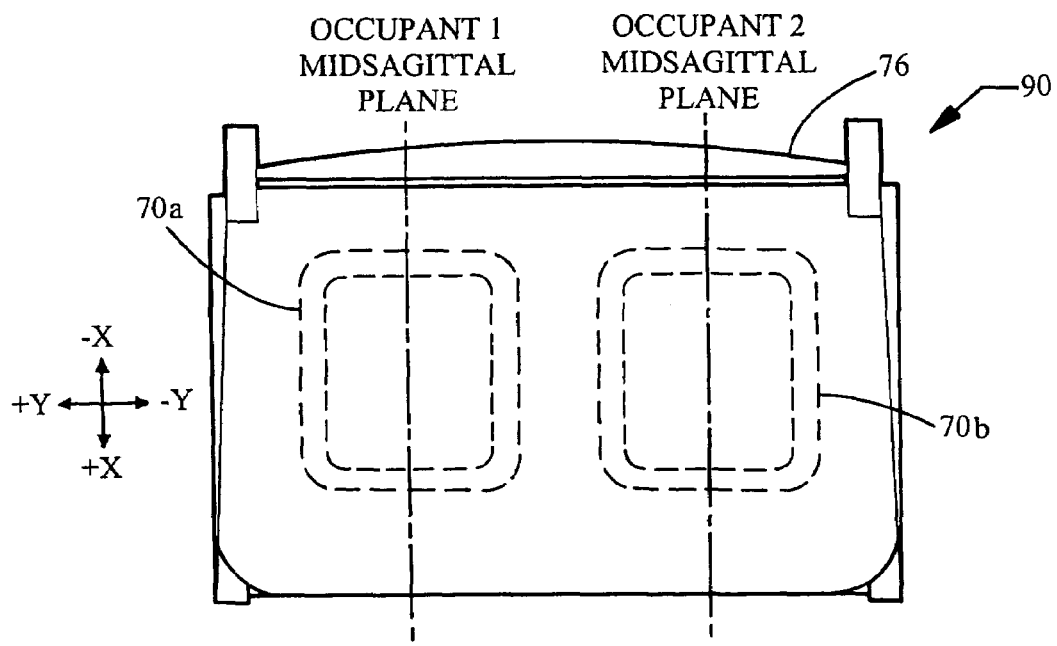
FIGS. 6A and 6B are see-through top and side views, respectively, of the control structure and sensor system of FIGS. 4A and 4B implemented in a bench style seat.
Figure 6B:
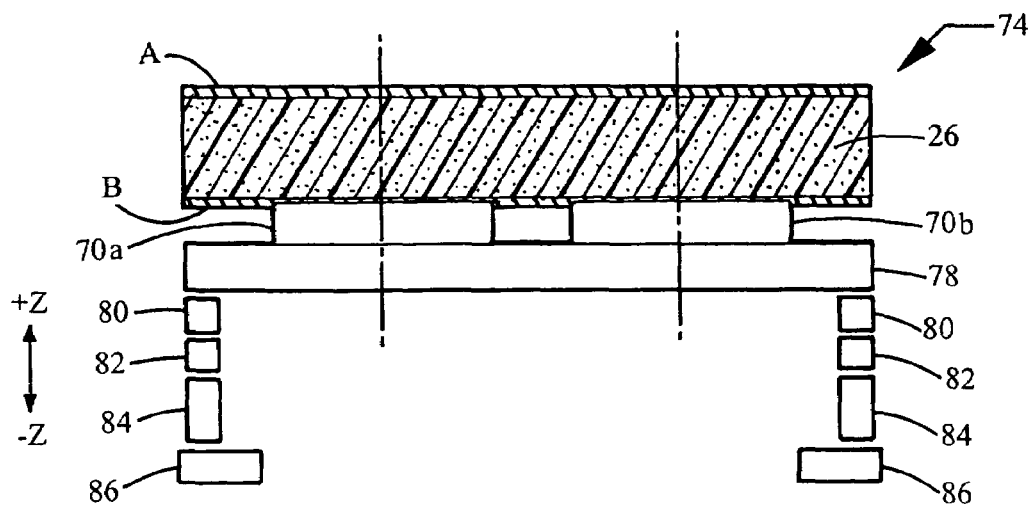

Referring now to FIGS. 6A and 6B, there is shown a bench style seat 90 with a pair of integrated units 70a and 70b positioned between the seat foam layer 26 and the frame or pan 78, where features similar to those shown in FIGS. 5A and 5B are designated by like reference numerals. Such an arrangement creates multiple, isolated sensing locations within a seat sensor system. This enables the sensor system to accommodate simultaneous loading of multiple occupants in a bench style seat system while maintaining isolation between the loading conditions. Moreover, the sensor system creates isolated calibration and sensing areas for the sensor system to accommodate multiple seated occupants and to control area specific sensitivity.

In another embodiment, rather than totally surrounding the sensor 63, the control layer of the integrated unit 70 can be arranged as strips or segments of specific geometries 68a-68g, as depicted in FIGS. 7A and 7B. As shown, the control layer includes a set of four elongated strips 68a, 68b, 68c, 68d, two smaller rectangular segments 68e, 68f, and a circular segment 68g. The strips 68a, 68b define an interior region 96, while the strips 68c, 68d define an interior region 98, with each region 96, 98 being occupied by a number of sensors 20. A region 100 is located between the rectangular segments 68e, 68f, where a pair of sensors 20 reside outside the circular segment 68g, and a fourth region 102 is located within the region 100, as defined by the interior of the circular segment 68g, in which a single sensor 20 resides.

The arrangement of the control layer strips and segments 68a-68g define the shape and geometry of the cushion foam interface to the sensor 63 and creates individual zones within a sensing system to facilitate calibration of the system. This arrangement also enables the sensor system to establish and maintain different sensitivity levels for different areas of the seat, enables the sensor system to be less sensitive to certain loading conditions and profiles, and enables the sensor system to be less sensitive to child restraint system loading conditions.

Figures 8A, 8B:
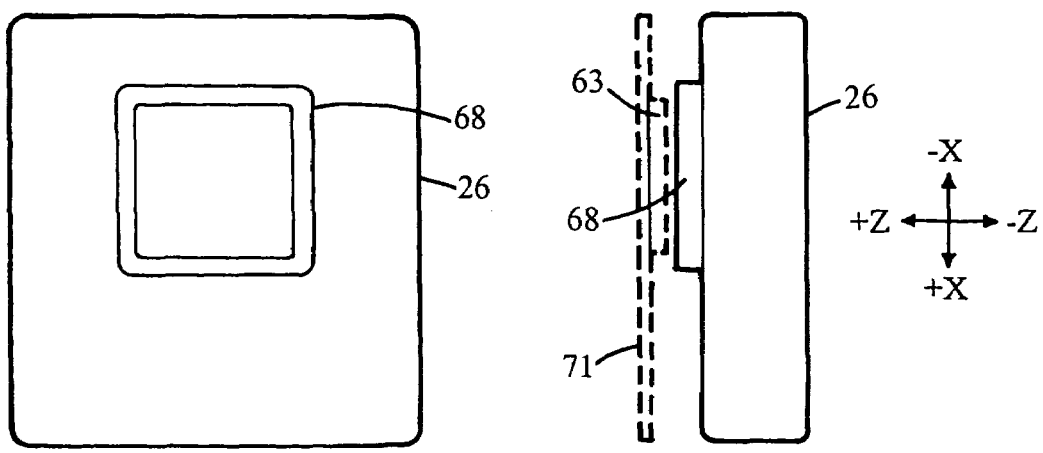
FIGS. 8A and 8B are see-through top and side views, respectively, of an alternative arrangement of the control structure and sensor system in accordance with the invention.

Although the control layer 68 and sensor 63 are described above as a single integrated unit 70, these components can be assembled in a number of configurations. For example, as shown in FIGS. 8A and 8B, the control layer 68 is formed as part of the seat foam layer 26, while the sensor 63 is carried by the reactive layer 71. When assembled, the reactive layer 71 and the seat foam layer 26 are brought together such that the sensor 63 resides within the interior of the control layer 68.

Referring now to FIGS. 9A and 9B, the control layer 68 is formed as part of the reactive layer 71, and the sensor 63 is carried by the reactive layer 71 and positioned in the interior region of the control layer 68. The unit is assembled by matting the seat foam layer 26 to the control layer 68.

Another configuration is illustrated in FIGS. 10A and 10B, where the control layer 68 is formed as part of the sensor 63. The combined unit 63, 68 is mounted to the reactive layer 71, and the final assembly is formed by mating the control layer 68 to the seat foam layer 26.

Figure 11A:
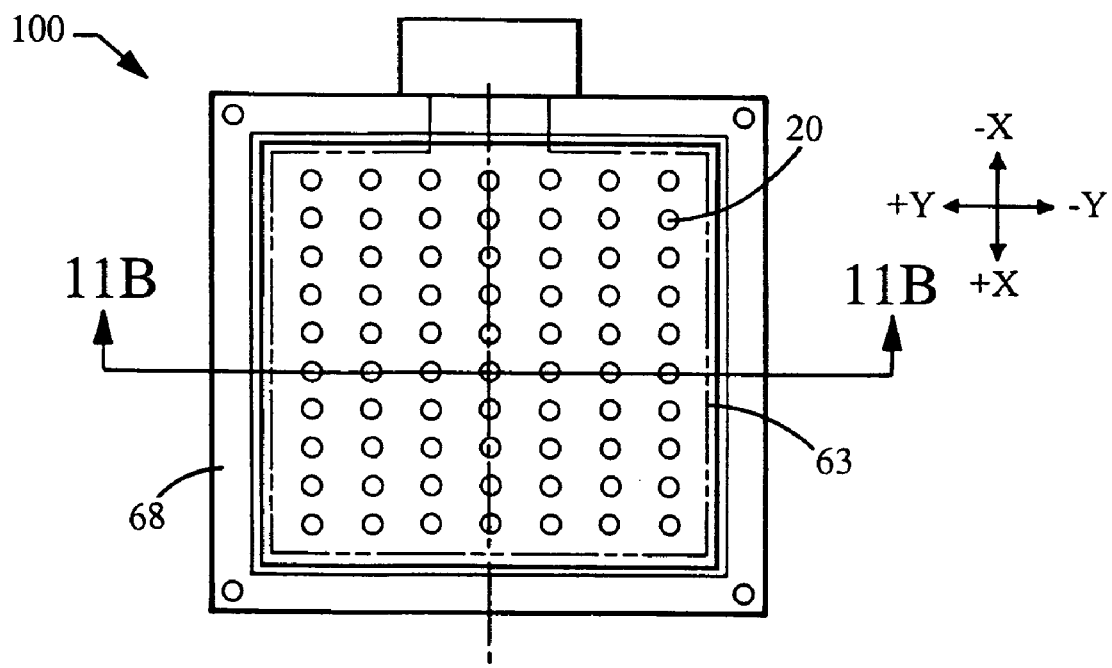
FIGS. 11A and 11B illustrate an alternative embodiment of a control structure with a load diffusion layer.
Figure 11B:
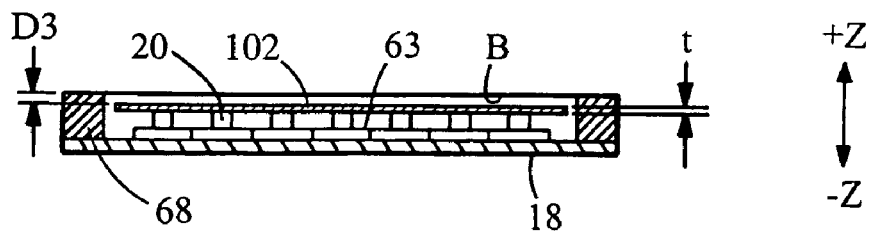

The "B" surface may be provided with a material or surface treatment that interfaces with the switches 20. As an example, the surface treatment is provided in an integrated unit 100 (FIGS. 11A and 11B) as a load diffusion layer 102 (FIG. 11B) with a thickness t positioned a distance D3 below the surface "B". As shown, the diffusion layer 102 resides inside the control layer 68, covering the entire array of switches 20. Alternatively, the diffusion layer may reside on top of the control layer 68 or it can be part of the control layer assembly resting on top of the switches. In some configurations, the diffusion layer 102 is attached directly to the "B" surface. Depending on the application, the load diffusion layer can be a plastic sheet, a fabric type material, or any other suitable material. The diffusion layer can be used to control wear on the various seat components and/or noise generated by the seat structure. Thus the surface treatment material can be used to prolong the age of the seat foam, as well as affect the product performance of the seat over its lifetime.

While the above description constitutes the preferred embodiment of the present invention, it will be appreciated that the invention is susceptible to modification, variation and change without departing from the proper scope and fair meaning of the accompanying claims. For example, it is not necessary that the switches 20 are on/off switches. Other types of switches can be used, such as analog switches or any other types of suitable switches. The switches may for instance provide a range of outputs rather than a single "on" signal when contact is made. Moreover, the control structure or layer 68 and the associated sensor 63 may be located in other parts of the seat, such as the seat back.

What is claimed is:

1. An occupant classification system for a motor vehicle of the type having one or more occupant seats and an inflatable restraint system for providing impact protection for an occupant of the seat, the occupant classification system classifying an occupant of the seat as a function of certain types of occupants occupying the seat, the occupant classification system comprising:

an array of electrical switches positioned between a seat trim of the seat and a reactive surface, the switches producing selective outputs signals as an engaging surface of the seat makes contact with one or more of the switches when the occupant occupies the seat, the output signals being interpreted into a control signal to distinguish between occupants for controlling the inflatable restraint system; and a control structure which defines a distance between the array switches and the engaging surface that is greater than zero when the seat is unoccupied so that the switches are insensitive to the initial forces applied to the seat through the seat trim, the distance between one or more of the switches and the engaging surface decreasing to zero when the occupant occupies the seat to produce the selective output signals.

2. The classification system of claim 1 wherein the initial forces are the attachment forces applied to the trim covering the seat.

3. The classification system of claim 1 wherein the array is divided into zones with at least one of the switches in each of the zones.

4. The classification system of claim 3 wherein the control signal is based upon the number of the switches activated in each of the zones.

5. The classification system of claim 4 wherein the control signal is based upon the number of the zones having the switches which are activated.

6. The classification system of claim 3 wherein the zones include at least a pair of outer lateral zones, and a center zone.

7. The classification system of claim 6 wherein the center zone includes an inner substantially circular region and a pair of outer non-circular regions.

8. The classification system of claim 3 wherein each zone is a discrete zone defined by one or more portions of the control structure.

9. The classification system of claim 8 wherein the discrete zones establish and maintain different sensitivity levels for different areas of the seat.

10. The classification system of claim 9 wherein the discrete zones enable the system to be less sensitive to certain loading conditions and profiles.

11. The classification system of claim 1 wherein the switches are carried by an array mat.

12. The classification system of claim 1 wherein the switches are positioned between a foam seat cushion and a seat suspension.

13. The classification system of claim 1 wherein the control structure is a integral unit totally surrounding the array of switches.

14. The classification system of claim 1 wherein the control structure is formed of a plurality of segments defining divided zones with at least one switch in each of the zones.

15. The classification system of claim 1 wherein the reactive surface is defined by a portion of a reactive structure formed with the control structure as an integrated unit.

16. The classification system of claim 1 wherein the control structure and the array of switches are formed as an integrated unit.

17. The classification system of claim 1 wherein the array of switches and the seat cushion are formed as an integrated unit.

18. The classification system of claim 1 wherein compressive forces produced by the seat trim are restrained by the control structure and not by the switches when the seat is unoccupied.

19. The classification system of claim 18 wherein the compressive forces are restrained by both the control structure and one or more of the switches when the occupant occupies the seat.

20. The classification system of claim 1 further comprising a load diffusion layer positioned between the seat trim and the array of switches.

* * * * *